Oct. 23, 1951　　　T. N. YOUNG ET AL　　　2,572,555
WATER PIPE REPAIRING EQUIPMENT

Filed Oct. 19, 1945　　　　　　　　　　　5 Sheets—Sheet 1

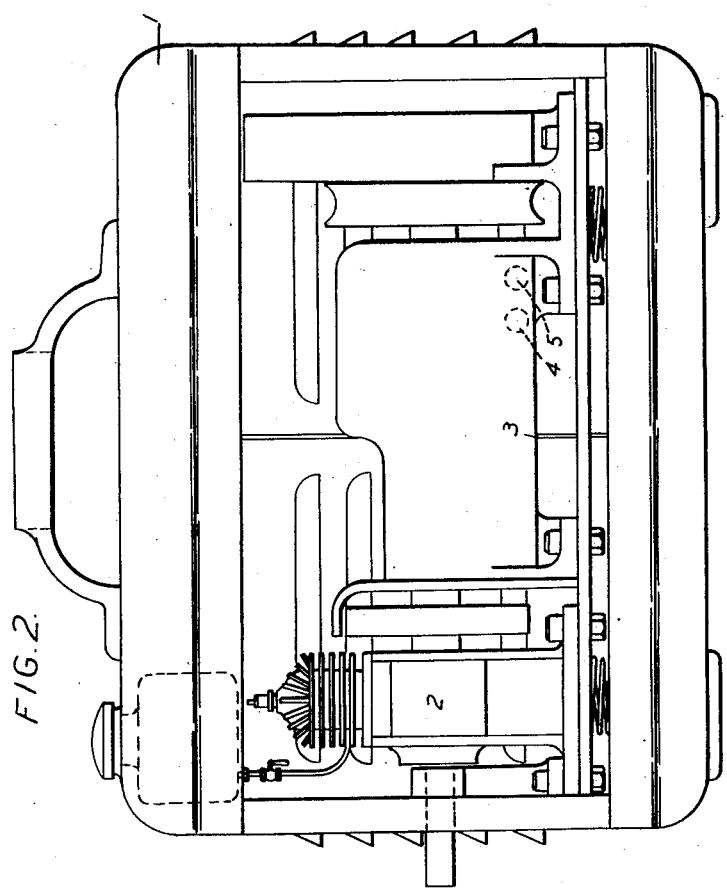

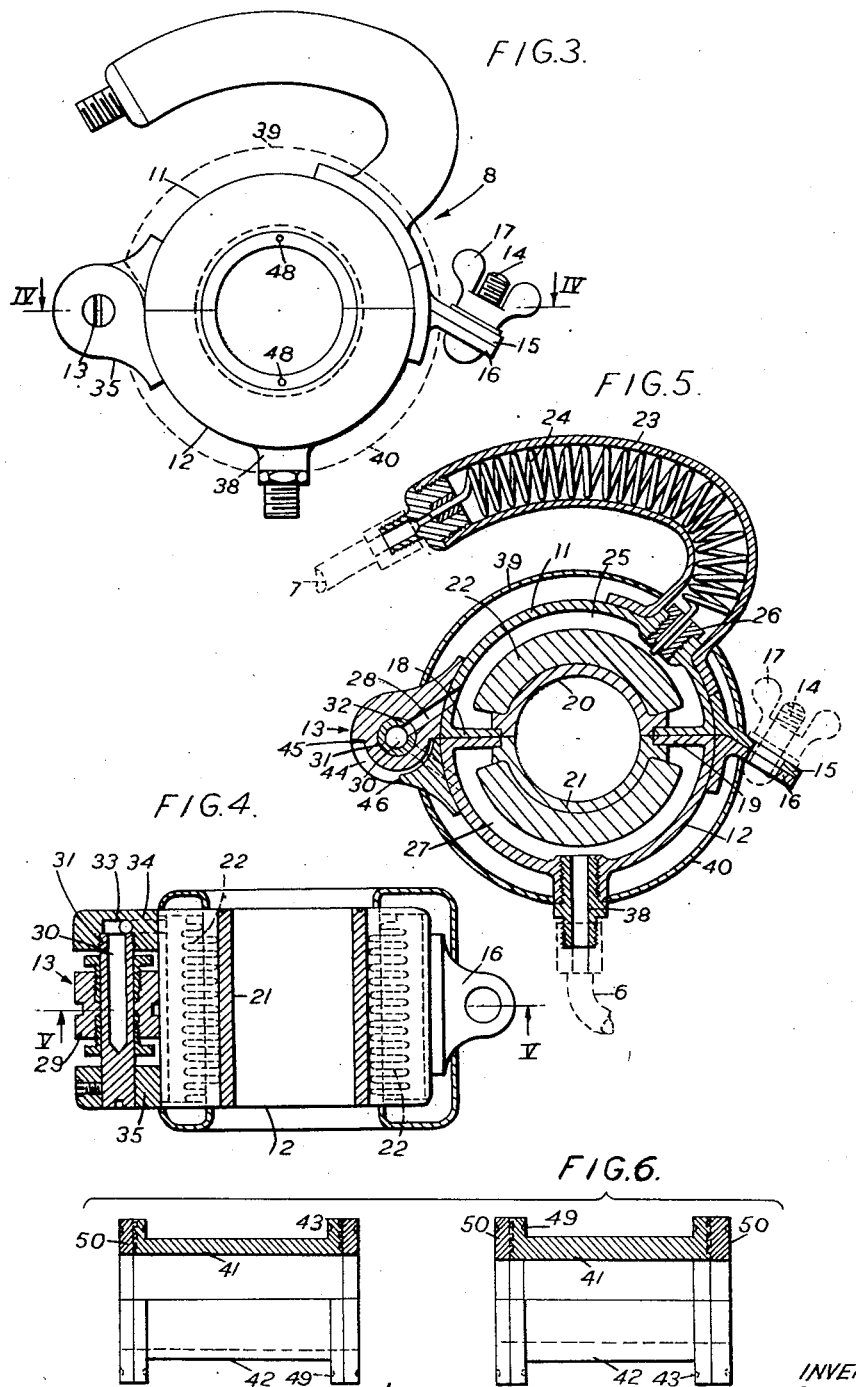

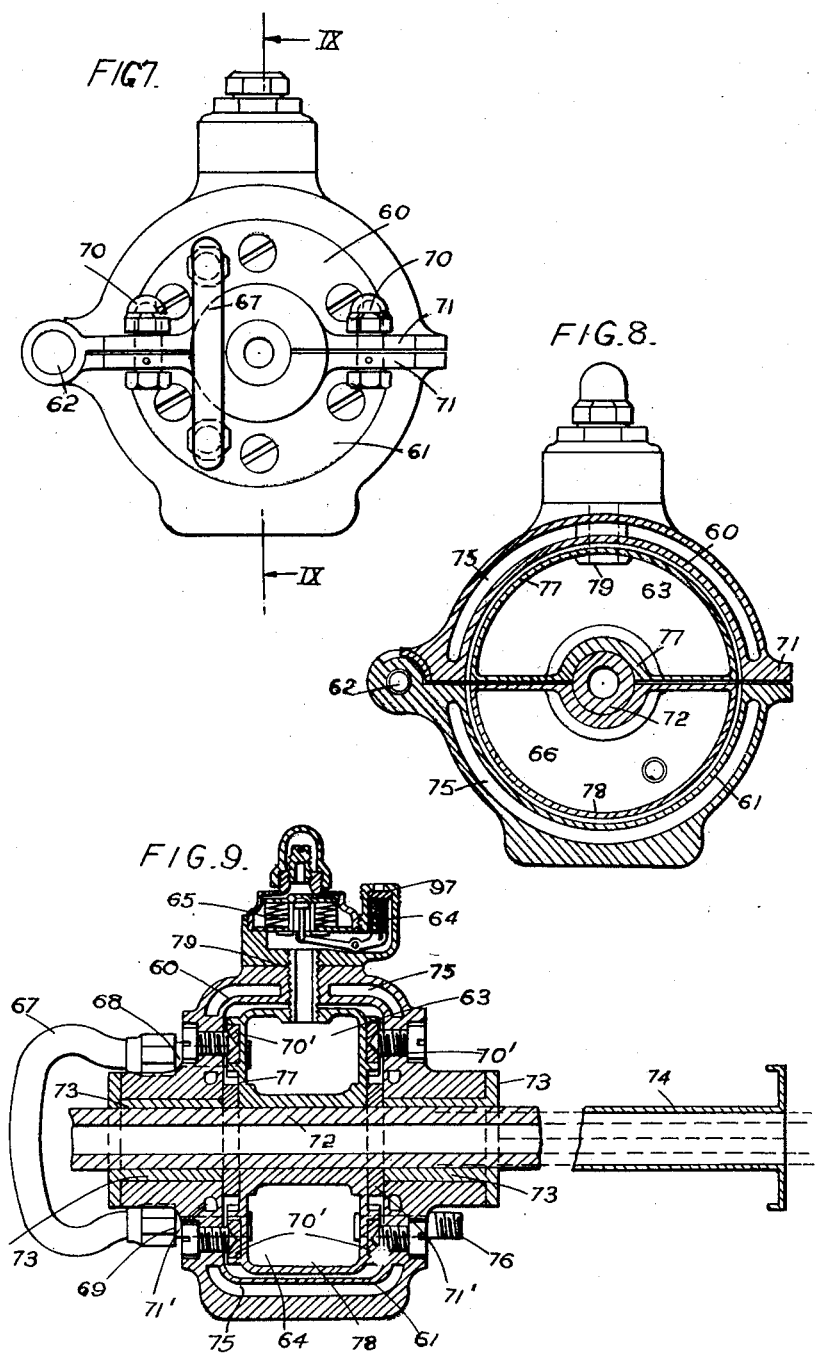

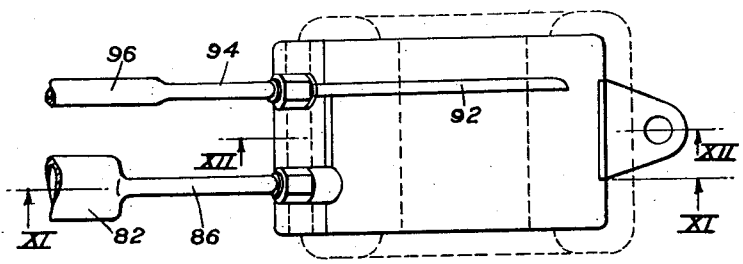
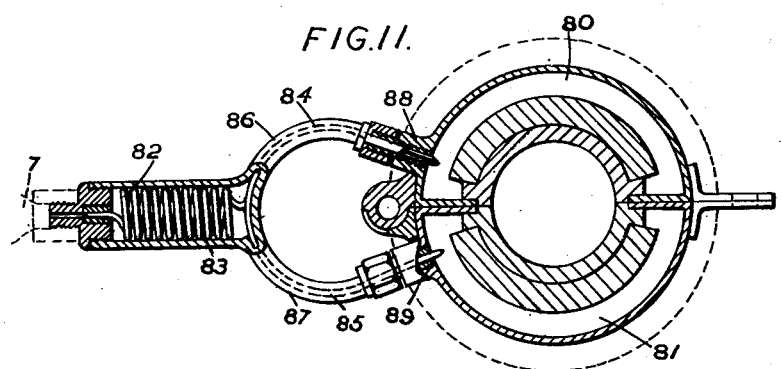
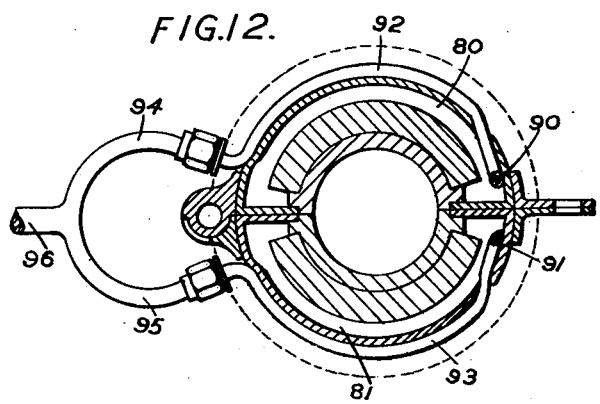

Patented Oct. 23, 1951

2,572,555

UNITED STATES PATENT OFFICE 2,572,555

WATER PIPE REPAIRING EQUIPMENT

Thomas Nicholas Young, Epsom, and Eric Guy Brian Gledhill, Sutton, England, assignors to Freez-Seal Equipment Company Limited, New Malden, England, a British company Application October 19, 1945, Serial No. 623,308
In Great Britain November 3, 1944

4 Claims. (Cl. 62—1)

In supplying water to domestic and other premises, it is the common practice to connect the premises to mains by separate service pipes. Most of these service pipes are of standard small sizes and they are fitted with stop-cocks. If a burst occurs in a service pipe between the main and the stop-cock, or if the stop-cock is defective and in need of repair, it is necessary to cut off the water from the service pipe concerned before repair work can be undertaken. This is done by shutting valves on the individual main which supplies the service pipe, and after the valves on the main have been closed, the main and service pipe have to be emptied. The act of emptying the main also empties all the service pipes supplying premises in the same road or district, and this puts the water consumers to considerable inconvenience and is a source of annoyance and complaint.

An important object of this invention is to provide a simple apparatus by means of which the necessity for closing and emptying the main with all the attendant inconveniences, can be wholly avoided.

Another object is to provide a portable plant by which a short length of a liquid-containing pipe or conduit can be temporarily frozen.

A further object is to provide an improved freezing device.

Essentially, we achieve our primary object by stopping the flow through the service pipe by freezing a short length of the liquid contained therein, and to enable this to be done readily, we provide a portable plant comprising the combination of a refrigerating apparatus employing a circulating refrigerant, means for circulating the refrigerant, a device adapted to fit around the pipe to be repaired or altered and including a chamber for the reception of circulating refrigerant, and flexible connections between the refrigerating apparatus and the said chamber. By means of such a plant a short length of the pipe and the liquid therein can be rapidly frozen after the device has been assembled around the pipe.

The device which fits closely around the pipe may comprise a container made in two parts adapted to be assembled around the pipe and, when so assembled, making close contact with the pipe or with a liner between them and the pipe, one at least of the two parts forming an expansion chamber for the circulating refrigerant, and connections being provided for the supply and withdrawal of the refrigerant to the device.

Some apparatus, according to the invention, will now be described by way of example, with reference to the accompanying drawings, in which:

Figure 2 is a side elevation of the plant shown in Figure 1 with side cover removed;

Figure 3 shows, on a larger scale, a side view of a device forming part of the plant shown in Figure 1;

Figure 4 is a section on the line IV—IV in Figure 3;

Figure 5 is a section on the line V—V in Figure 4;

Figure 6 shows some liners for use with the device shown in Figures 3 to 5;

Figure 7 is an end view of a modified device;

Figure 8 is a transverse section through the device illustrated in Fig. 7;

Figure 9 is a section on the line IX—IX in Figure 7;

Figure 10 is a plan view of another modified device; and

Figures 11 and 12 are sections on the lines XI—XI and XII—XII respectively in Figure 10.

Figure 1:
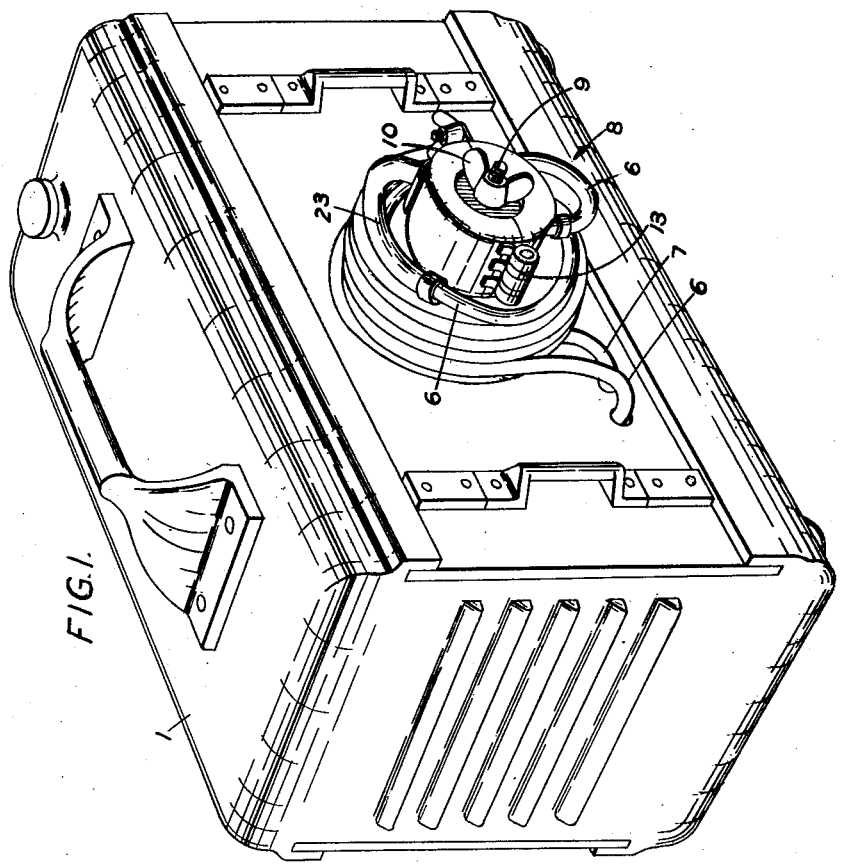
Fig. 1 is a perspective view of a portable plant.

The complete plant taken to the site where the work is to be done, is shown in Figures 1 and 2. It comprises a casing 1 containing an internal-combustion engine 2 geared to drive a compressor 3 for circulating refrigerant such as methyl chloride or sulphur dioxide. The intake and delivery ports 4 and 5 of this compressor are connected by flexible pipes 6 and 7 (see Figs. 1 and 5), to a device 8. The casing 1 is provided with means in the form of a threaded rod 9 and nut 10, for supporting the device 8 for transport and storage purposes.

On arrival at the site, the nut 10 is unscrewed and the device 8 detached. This device, shown in Figures 3 to 5, is formed in two parts 11 and 12 united by a hinge 13. Each part is semi-cylindrical and the unit is opened out and put round the length of pipe the liquid within which is to be frozen, being then tightened in position by a bolt 14 which passes through two mating flanges 15 and 16 and receives a nut 17.

The parts 11 and 12 are made with machined mating surfaces 18 and 19, and two semi-cylindrical members 20 and 21 are welded or otherwise secured to the surfaces 18 and 19, respectively. These members are of radius such that they will fit tightly around the largest pipe on which work may have to be done, and their inner surfaces are machined so that they will make close metal-to-metal contact with said pipe. Externally the members 20 and 21 are provided with fins 22 for the purpose of increasing the rate of heat transfer through the members.

The part 11 of the casing is provided with a rigid pipe 23 connected at one end to the flexible pipe 7 and containing a coiled tube 24 through which refrigerant delivered by the compressor 3 through the pipe 7 flows to the interior 25 of the part 11, the outlet end of the tube 24 being fixed to a bush 26 screwed into the wall of the part 11. The interior 25 of the part 11 is an expansion chamber for the refrigerant, and the coiled tube 24 acts in the same way as an expansion valve. On arriving in the chamber 25, the refrigerant expands and extracts heat from the water in the pipe around which the device is fixed. The refrigerant flows into the interior 27 of the part 12, this interior forming a second expansion chamber. The connection between the two expansion chambers 25 and 27 is made in the hinge 13, and comprises a passage 28 in a central hinge member 29 secured to the part 11, a bore 30 in a hinge pin 31 which has a lateral opening 32 registering with the passage 28, and a passage 33 in a hinge member 34 secured to the part 12, this member 34 being tapped to receive the end of the pin 31. A further hinge member 35 is also secured to the part 12 and receives the second end of the hinge pin. The hinge member 29 is slotted as shown at 44 (Fig. 5) to provide a shoulder 45 which engages one end of a fixed bracket 46, so that the extent to which the part 11 can rock relatively to the part 12 is limited.

The refrigerant leaves the expansion chamber 27 by way of an outlet 38 to which the flexible pipe 6 is connected.

The parts 11 and 12 of the device 8 are provided with sheet-metal casings 39 and 40 containing any appropriate insulating material (not shown).

Since pipes of different diameters are encountered in practice, it is important to provide means for adapting the device 8 to them. Accordingly, a series of two-part liners is provided, two of these being shown in Figure 6. Each liner consists of two semi-cylindrical parts 41 and 42 provided with end flanges 43. The external diameter of each is the same, and is such, that the liner makes close metal-to-metal contact with the cylindrical bore provided by the inner surfaces of the members 20 and 21, while the flanges 43 fit tightly against the end walls of these members within the casings 39 and 40. The internal diameters of all the liners are of sizes such as to fit closely the various different sizes of pipes likely to be encountered in the use of the device.

It is convenient to put the appropriate liner into the device 8 before applying the device to the pipe. To hold the liner in position, a spring-pressed ball catch 48 is provided in each end of each member 20 and 21 and snaps into a corresponding recess 49 in the end of the corresponding liner part 41 or 42.

The end flanges 43 are covered by insulation 50.

The modified form of device shown in Figures 7, 8 and 9 resembles the device 8 previously described, in that it is made in two parts 60 and 61 hinged together at 62 and adapted to be rapidly assembled around a pipe and tightened by bolts 70 passing through flanges 71. Expansion chambers 63 and 66 are formed in the parts 61 and 62, respectively, by the spaces inside metal shells 77 and 78, which are spaced away from the parts 60 and 61 by insulating bushes 70' and 71' but make close contact with the pipe 72 to be repaired. On the outer faces of the bushes 71', two-part copper bushes 73 surround the pipe 72 within the parts 60 and 61. The refrigerant flows from the pipe 7 through an inlet 97 and passes through a valve 64 loaded by a spring 65, next flowing through an inlet tube 79 into the expansion chamber 63. The connection between the expansion chamber 63 and the second expansion chamber 66 in the part 61, is formed by a flexible pipe 67 which units two short rigid pipes 68 and 69 passing through the walls of the chambers 63 and 66, respectively. For smaller pipes, two-part copper sleeves, one of which is shown at 74, are provided, these being the equivalent of the liners shown in Figure 6.

Insulation is provided in this case by making the parts 60 and 61 as hollow shells, that is to say, with internal cavities 75, and evacuating these cavities.

The pipe 6 is connected to an outlet 76.

In the modified form of device shown in Figures 10 to 12, there are two expansion chambers 80 and 81 closely resembling the chambers 25 and 27, but the incoming refrigerant is divided into two streams, one of which traverses one expansion chamber while the other traverses the other, the two streams being united again on their way back to the compressor. The refrigerant flows from the flexible pipe 7 to a coiled tube 82 most of which is protected by a flexible covering 83 and which has two branches 84 and 85 lying within and protected by flexible pipes 86 and 87, respectively, which are united to inlets 88 and 89 on the two parts of the device which respectively form the expansion chambers 80 and 81. The two streams leave the chambers by way of outlets 90 and 91 formed by the ends of pipes 92 and 93, respectively, which pass through the walls of the device and are curved to the contour of the outside of the device and, in turn, are connected to the two flexible arms 94 and 95 of a Y-pipe 96 which is connected to the flexible pipe 6.

The invention is not restricted to the examples illustrated. For instance, although it is very convenient to provide a portable plant which constitutes a self-containing unit, in that it contains a power unit and a compressor in a single casing, this is not essential. For instance, the compressor may be driven by the engine of a vehicle on which the plant is carried, or a refrigerating apparatus operated by heat such as might be provided by a suitable stove or other suitable burner, may be used. Again, the power unit may be an electric motor utilising electric power from batteries or a generator upon a vehicle or from the supply in the premises to which the service pipe is connected.

Although the apparatus is particularly useful in the repair of service pipes in water-supply systems, it may also be used in all cases of repairs or alterations to pipes conveying liquids capable of being readily frozen, whenever it is desirable to effect the repair or alteration without turning off the supply or draining the pipe system. The apparatus may also be used for the temporary stoppage of leaks, without the necessity of undertaking a repair, or may be employed for temporarily shutting off the flow of liquid at any point in a pipe system without altering the lay-out of the pipes or inserting stop-cocks or the like.

We claim:

1. An apparatus for use in temporarily freezing the liquid within a short length of liquid-containing pipe, comprising an expansion chamber for refrigerant made in two parts adapted, when assembled, to define a cylindrical bore extending through said expansion chamber for the reception of the pipe; and wherein a hinge connects one pair of adjacent edges of said parts; and wherein fastening means are provided between the other pair of adjacent edges of said parts, to facilitate application to, and fastening of, said expansion chamber around said pipe.

2. An apparatus as claimed in claim 1 in which the interiors of the two parts of the expansion chamber are arranged to be connected for the circulation of refrigerant in series therethrough, and in which said connection is made by interconnecting passages in said hinge.

3. An apparatus for use in temporarily freezing the liquid within a short length of liquid-containing pipe comprising an expansion chamber for refrigerant made in two parts adapted, when assembled, to define a cylindrical bore extending through said chamber for the reception of the length of pipe, each part comprising spaced inner and outer walls having end walls extending therebetween to define an expansion chamber; releasable means interconnecting said parts to permit separation thereof for application around the length of pipe; a substantially cylindrical liner within said cylindrical bore and comprising two substantially semi-cylindrical sections one within each part of said two-part expansion chamber with the outer surface of said cylindrical liner in contact with the wall defining the said cylindrical bore and with the inner surface of said liner of a diameter substantially equal to that of the external diameter of the pipe length to enable the apparatus to make close contact with a pipe of lesser diameter than the internal diameter of said cylindrical bore; and means for detachably securing said liner within said cylindrical bore to permit ready detachment thereof from said bore and the replacement of said liner with a similar liner having a different internal diameter, whereby the apparatus is usable with pipe lengths of different external diameters.

4. An apparatus as claimed in claim 3 wherein at least one end of the cylindrical liner is provided with a radially-extending flange adapted to contact an end wall of one of the parts constituting the expansion chamber, and wherein a releasable fastening means is interposed between the contacting faces of said flange and said end wall to detachably secure said liner within the cylindrical bore of said expansion chamber.

THOMAS NICHOLAS YOUNG.
ERIC GUY BRIAN GLEDHILL.

REFERENCES CITED

The following references are of record in the file of this patent:

UNITED STATES PATENTS

| Number | Name | Date |
| --- | --- | --- |
| 1,896,953 | Hassell | Feb. 7, 1933 |
| 1,919,500 | Carpenter | July 25, 1933 |
| 2,218,602 | Carryl | Oct. 22, 1940 |
| 2,257,727 | Bennett et al. | Oct. 7, 1941 |
| 2,415,455 | Barnes et al. | Feb. 11, 1947 |
| 2,440,397 | Erickson | Apr. 27, 1948 |